Nov. 2, 1971 H. G. EMPSON Re. 27,216

EXPANDABLE LINK

Original Filed Aug. 11, 1964

INVENTOR.
HERBERT G. EMPSON

BY Allen and Cheney

ATTORNEYS

United States Patent Office

Re. 27,216
Reissued Nov. 2, 1971

27,216
EXPANDABLE LINK

Herbert George Empson, 2027 Lynwood Terrace, San Jose, Calif. 95128

Original No. 3,298,173, dated Jan. 17, 1967, Ser. No. 388,896, Aug. 11, 1964, which is a continuation of abandoned Ser. No. 802,283, Jan. 13, 1969. Application for reissue Mar. 26, 1970, Ser. No. 20,476
Int. Cl. F16g *13/24*
U.S. Cl. 59—78 5 Claims

Matter enclosed in heavy brackets [ ] appears in the original patent but forms no part of this reissue specification; matter printed in italics indicates the additions made by reissue.

*ABSTRACT OF THE DISCLOSURE*

*A shock absorbing link for use in tie-down means for cargo in transit, wherein an endless chain is embedded in a resilient body member of elongated configuration.*

*This application is a continuation of Ser. No. 802,283, filed Jan. 13, 1969, now abandoned.*

This invention relates to a resilient, elastic link for use in tie-down chains, ropes and the like.

An object of this invention is to provide an improved resilient, elastic link for use with tie-down hooks to absorb shock and prevent the hooks attached to automobiles and other apparatus from being torn therefrom by shock during transit.

Another object of this invention is to provide an improved resilient, elastic link for use with tie-down hooks to absorb shock, said elastic link being provided with a body made of resilient, elastic material having embedded therein a short length of chain in a preoriented position which is in its non-extended condition when said body is in its non-distorted condition, said body also being provided with opposed apertures extending through links to the embedded chain whereby said body may be attached to the tie-down hooks and the elastic body will stretch to the extent permitted by the embedded chain when subjected to shock and thus preventing said tie-down hooks from being torn out of the apparatus anchored thereby.

Other and further objects of this invention will be apparent to those skilled in the art to which it relates from the following specification, claims and drawing in which, briefly:

Figure 3:
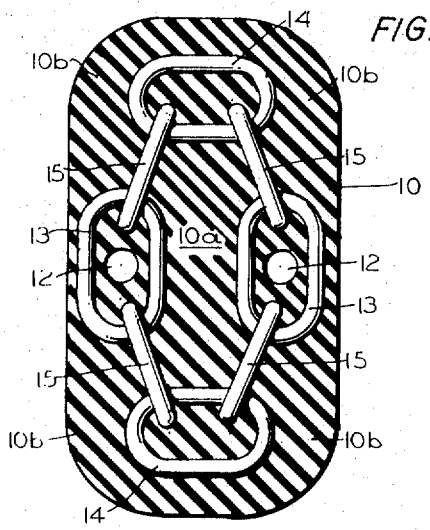
Figure 4:
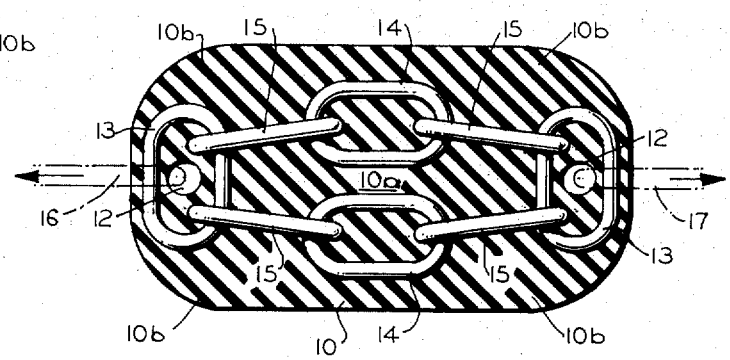

FIG. 3 is a sectional view of the elastic link of this invention showing the chain embedded therein in its non-extended condition; and FIG. 4 is a sectional view of the link showing the elastic body member distorted to the extent permitted by the embedded chain when the link is in the process of absorbing shock to which the tie-down hooks are subjected, thus preventing the hooks from being torn out of automobiles and other apparatus during transit on flat cars or in box cars.

Figure 1:
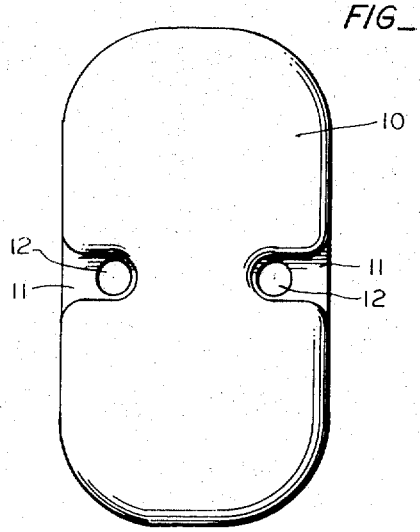
FIG. 1 is a plan view of one of the elastic links embodying this invention.
Figure 2:
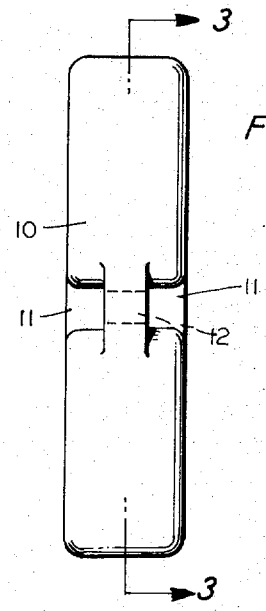
FIG. 2 is a side view of the link shown in FIG. 1.

Referring to the drawing in detail, reference numeral 10 designates the body of the link, which may be made of elastic material such as rubber and which is readily molded in a suitable die. This body member is made of generally rectangular shape as shown, and each of the long sides thereof is provided with opposing recesses 11, as shown in FIGS. 1 and 2. The holes 12 open into the recesses 11 so that suitable hooks or other attaching means may be inserted into these holes 12. The elastic link is thus attached to the tie-down hooks, rope or chain used for bracing or attaching automobiles, boxes, machines or the like on railway flat cars or in box cars and functions to prevent the tie-down means from being torn out of these objects by shock during transit.

A chain comprising the links 13, 14 and 15, which has a tensile strength of 6000 pounds, for example, is embedded in the body 10 during the molding of this body so that the links are disposed therein substantially as shown in the sectional view of FIG. 2 when the elastic body 10 is in its non-distorted condition. Thus, the links 13 are positioned in the end parts of the body, while links 15 are used for joining links 13 and 14.

When the body 10 is subjected to shock which is transmitted to it by the tie-down means 16 and 17 shown in FIG. 4, which are hooked into the apertures 12 of the body member, the body 10 is distorted substantially to the shape shown in FIG. 4 since it is made out of resilient or elastic material, such as rubber. Both of the end parts **10*b* around the links 14 and the central part 10*a* will stretch when the body is subjected to shock. Also, the chain links 13, 14 and 15 will assume the position shown in FIG. 4, which shows the device subjected to a shock of, for example, 2000 pounds, transmitted to it from the tie-down means 16 and 17**. Thus, this device, by absorbing shock from the tie-down means, prevents the hooks holding the automobiles or other equipment from being torn therefrom during shock. Different embodiments of this device may be constructed to absorb shocks of different intensities. Thus, different sizes of shock absorbing links may be used with different size loads. Also, more than one link may be used either in series or in parallel in the tie-down cable.

While I have shown a preferred embodiment of this invention it will be understood that the invention is capable of variation and modification from the form shown so that its scope should be limited only by the scope of the claims appended hereto.

What I claim is:

1. A shock absorbing link for use in tie-down means for securing cargo such as automobiles and the like during transit, comprising the combination of a resilient body member of elongated configuration, an endless chain having a plurality of metal links embedded in said body member, said chain being embedded in an extended condition in a direction corresponding substantially to the axial direction of the elongated configuration of said body member, said body member having opposed apertures in the long sides thereof for receiving attaching means of tie-down means used to secure various cargo during transit, spaced links of said chain being embedded in said body with said apertures passing therethrough so that said attaching means is adapted to be inserted through said spaced links whereby said chain is extended in a direction substantially perpendicular to said first direction under restraint of said resilient body when said body is absorbing shock to which said tie-down means is subjected so that said tie-down means is not torn from the machines secured thereby during transit.

2. A shock absorbing link for use in tie-down means for securing cargo such as automobiles and the like during transit, comprising the combination of a resilient body member of generally rectangular configuration, a plurality of metal links of a chain embedded in said body member, at least part of said embedded links normally forming a U-shaped loop, said body member having opposed apertures in the long sides of its generally rectangular configuration for receiving attaching means of tie-down means, spaced links of said U-shaped loop being embedded in said body with said apertures passing therethrough so that said attaching means is adapted to be inserted through said spaced links whereby U-shaped loop of said chain is extended under restraint of said resilient body member when the latter is stretched by shock to which said tie-down means is subjected.

3. A shock absorbing link for use in tie-down means for securing cargo such as automobiles and the like during transit, comprising the combination of a resilient body member [of normally elongated configuration], said body member having opposed apertures [in the midportions of the long sides thereof] for receiving attaching means of tie-down means used to secure various cargo during transit, a chain embedded in said resilient body member with said apertures passing through spaced links thereof, said chain normally forming a loop [extending into at least one end portion of said resilient body member from said apertures in said mid-portions], said chain being adapted to be extended from its normally looped configuration under restraint of said resilient body member when said body member is absorbing shock to which said tie-down means is subjected during transit of the cargo.

*4. A shock absorbing link comprising the combination of a plurality of interconnected chain links having sections which are adapted to receive attaching means, and a resilient body member molded about and embedding said chain links with the latter normally in non-aligned relation between said sections thereof, the body permitting by stretching of the same restrained movement of the links toward alignment when subjected to straightening force such as shock experienced in the attaching means.*

*5. A shock absorbing link comprising the combination of flexible tension means having two spaced-apart connector sections adapted to receive attaching means, with*

*at least two lengths of said tension means extending between and having corresponding ends respectively joined to said connector sections, said lengths including opposed loop portions, and a resilient body member molded about and embedding said loop portions, the body permitting by resilient deformation of the same straightening movement of the loop portions between the connector sections in response to pulling force applied to the latter tending to increase the normal separation thereof.*

References Cited

The following references, cited by the Examiner, are of record in the patented file of this patent or the original patent.

UNITED STATES PATENTS

| | | | |
|---|---|---|---|
| 1,779,663 | 10/1930 | Cowell | 267—70 |
| 2,080,627 | 5/1937 | Morgan | 59—78 |
| 2,110,226 | 3/1938 | Hill | 59—78 |
| 2,192,946 | 3/1940 | Towner | 59—84 |
| 2,232,847 | 2/1941 | Geyer | 192—99 R |
| 2,878,013 | 3/1959 | Piodi | 267—69 |
| 3,228,481 | 1/1966 | Eldred | 170—160.58 |
| 2,452,752 | 11/1948 | Hartranft | 59—79 |

FOREIGN PATENTS

| | | | |
|---|---|---|---|
| 1,161,994 | 3/1958 | France | 267—69 |

CHARLES W. LANHAM, Primary Examiner

G. P. CROSBY, Assistant Examiner

U.S. Cl. X.R.

267—69